(12) United States Patent
Arba et al.

(10) Patent No.: US 6,398,965 B1
(45) Date of Patent: Jun. 4, 2002

(54) WATER TREATMENT SYSTEM AND PROCESS

(75) Inventors: John W. Arba, Bradford; Gary V. Zoccolante, Plymouth; Jonathan H. Wood, Needham; Gary C. Ganzi, Lexington, all of MA (US)

(73) Assignee: United States Filter Corporation, Palm Desert, CA (US)

( * ) Notice: Subject to any disclaimer, the term of this patent is extended or adjusted under 35 U.S.C. 154(b) by 0 days.

(21) Appl. No.: 09/052,232

(22) Filed: Mar. 31, 1998

(51) Int. Cl.$^7$ ................................................ B01D 61/00
(52) U.S. Cl. ........................ 210/652; 210/900; 210/639; 210/257.2; 210/663
(58) Field of Search ................................ 210/900, 639, 210/652, 195.1, 195.2, 257.2, 175, 181, 182, 259, 653, 663

(56) References Cited

U.S. PATENT DOCUMENTS

| | | | |
|---|---|---|---|
| 3,721,621 A | 3/1973 | Hough | 210/22 |
| 3,870,033 A | 3/1975 | Favlor et al. | 126/360 R |
| 3,953,580 A | 4/1976 | Allen et al. | 423/283 |
| 4,280,912 A | 7/1981 | Berry, III et al. | 210/646 |
| 4,321,145 A | 3/1982 | Carlson | 210/678 |
| 4,574,049 A | 3/1986 | Pittner | 210/639 |
| 4,595,498 A | 6/1986 | Cohen et al. | |
| 4,642,192 A | 2/1987 | Heskett | 210/638 |
| 4,695,386 A | 9/1987 | Berry | |

(List continued on next page.)

FOREIGN PATENT DOCUMENTS

| | | |
|---|---|---|
| EP | 0 051 104 A1 | 5/1982 |
| EP | 0 576 752 A1 | 1/1994 |
| GB | 2 309 222 A | 7/1997 |
| JP | 62204892 A | 9/1987 |
| JP | 02207888 A | 8/1990 |
| JP | 02227185 | 9/1990 |
| JP | 94 100589 A | 4/1992 |
| JP | 06063549 | 3/1994 |

(List continued on next page.)

OTHER PUBLICATIONS

"Permasep Engineering Manual", Bulletin 306, Du Pont Company, pp. 1–4, Dec. 1982.*

(List continued on next page.)

*Primary Examiner*—Ana Fortuna
(74) *Attorney, Agent, or Firm*—Wolf, Greenfield & Sacks, P.C.

(57) ABSTRACT

A water treatment system and process for removing weakly ionized and/or organic materials from the water by intra-system pH adjustment. An exemplary embodiment of the system includes an inlet through which a feedstream passes into a first chemical treating unit wherein the pH of the feedstream is maintained below about 7 to substantially reduce a concentration of weakly basic components in the water by chemical conversion to a more ionized state. A first water treatment unit is positioned downstream of the first chemical treating unit to substantially remove ionized components in the stream, and produce a first product stream. In various embodiments, the first water treatment unit can be selected from the group consisting of a media filter unit, a water softener unit, a dechlorination unit, and combinations thereof. The first product stream is treated downstream of the first water treatment unit in a second chemical treating unit to maintain the pH of the first product stream above about 7 to substantially reduce a concentration of weakly acidic components in the water by chemical conversion to a more ionized state. A second water treatment unit is positioned downstream of the second chemical treating unit to substantially remove the ionized components, and produce a second product stream, which exits the system through a purified water outlet positioned downstream of the second water treatment unit.

15 Claims, 4 Drawing Sheets

U.S. PATENT DOCUMENTS

| | | | |
|---|---|---|---|
| 4,724,079 A | * 2/1988 | Sale et al. | |
| 5,028,336 A | 7/1991 | Bartels et al. | 210/639 |
| 5,073,268 A | 12/1991 | Saito et al. | 210/638 |
| 5,122,274 A | 6/1992 | Heskett | 210/638 |
| 5,135,654 A | 8/1992 | Heskett | 210/638 |
| 5,156,739 A | * 10/1992 | Dawson et al. | 210/321.8 |
| 5,198,118 A | 3/1993 | Heskett | 210/638 |
| 5,234,606 A | 8/1993 | Kazama et al. | 210/748 |
| 5,246,586 A | 9/1993 | Ban et al. | |
| 5,250,185 A | 10/1993 | Tao et al. | 210/654 |
| 5,316,637 A | 5/1994 | Ganzi et al. | 210/182.4 |
| 5,433,856 A | 7/1995 | Heskett | 210/638 |
| 5,476,591 A | 12/1995 | Green | 210/638 |
| 5,571,419 A | * 11/1996 | Obata et al. | 210/664 |
| 5,585,003 A | 12/1996 | Van Newenhizen | 210/664 |
| 5,603,844 A | 2/1997 | Murphy et al. | 210/757 |
| 5,670,053 A | 9/1997 | Collentro et al. | 210/652 |
| 5,766,479 A | 6/1998 | Collentro et al. | 210/639 |
| 5,833,846 A | * 11/1998 | Tanabe et al. | 210/202 |
| 5,925,255 A | 7/1999 | Mukhopadhyay | 210/652 |
| 5,997,745 A | 12/1999 | Tonelli et al | |

FOREIGN PATENT DOCUMENTS

| | | |
|---|---|---|
| JP | 09057261 | 3/1997 |
| JP | 10-202259 | 8/1998 |
| JP | 10314735 | 12/1998 |
| WO | WO 97/05945 | 2/1997 |
| WO | WO 98/06483 | 2/1998 |
| WO | WO 98/39085 | 9/1998 |
| WO | WO 98/52874 | 11/1998 |

OTHER PUBLICATIONS

Ultraviolet Dechlorination of Beverage Water, Coca–Cola, U.S.A., 1988, Ted A. Barber & Brannon H. Wilder.

UV Makes its Mark for Dechlorination, Water Technology, May 1998, Marc J. Scanlon.

Chlorine Removal, Ultrapure Water, Apr. 1998, Richard Combs and Norman Ammerer.

Dechlorination of Water Using Ultraviolet Light, 10–26 MIT Lab Course, Professor Clark K. Colton, Chem.

*Kemmer, Frank N. (editor). The Nalco Water Handbook, $2^{nd}$ ed. McGraw–Hill Book Company, p. 17.7. Dec. 1988.

"Improvement of Double–pass Reverse Osmosis System in the Demineralized Water Production", Journal "Membrane" pp. 155–164; 1997.

Monochloramine Removal by Granular Activated Carbon, Contemporary Dialysis and Nephrology, Mar. 1988, Kitty K. Siu et al.

Mastering the Science of Dechlorination, Water Technology, Mar., 1995, Dr. Lars Guenter Beholz KDF 55 Redox Alloy Removes Chlorine to Extend the Life of Granular Activated Carbon, KDF Fluid Treatment, Inc.

Water Dechlorination by Activated Carbon, Ultraviolet Radiation and Sodium Sulphite, Water Res., vol. 17, No. 6, pp. 667–676, 1983, M.A. Giles and R. Danell.

International Search Report Dated Jul. 13, 1999 PCT/US 99/06849.

Gafford, John T. and Peiche, John T., Two–Pass RO in a Pharmaceutical Application: A Case Study, 1997 Proceedings of the Conference Seminars, Philadelphia, Pa., pp. 1–16.

Jones, D. R. et al. . . Innovative Design for Chloramine Removal for Pharmaceutical Company Water Supply, Int'l. Water Conf. 1986 Paper No. 48,pp. 440–450.

* cited by examiner

WATER TREATMENT SYSTEM AND PROCESS

BACKGROUND OF THE INVENTION

1. Field of the Invention

The present invention relates to a water treatment system and process and, more particularly, to a water treatment system and process for producing purified water for high purity applications.

2. Description of the Related Art

High purity water is required in many industries such as the chemical industry, the foodstuffs industry, the electronics industry, the power industry, and the pharmaceutical industry. Typically these applications require treatment of a source water supply (such as from a municipal water supply) to reduce the level of contaminants. These treatment techniques can include distillation, filtration, ion exchange, reverse osmosis, photooxidation, ozonation, and combinations thereof.

In an effort to decrease biological contaminants in municipal water supplies, especially in warmer environments, the addition of chloramine to municipal water supplies has become commonplace. While effective as a biocidal agent, chloramine becomes a contaminant itself in certain industrial applications requiring high purity water. Furthermore, chloramine is difficult to remove from water without producing other unwanted contaminants such as ammonia. Municipal water supplies can also contain unacceptable levels of dissolved carbon dioxide, boric acid, silicic acid (hydrated silica) and/or organic materials. These weakly ionized and organic materials are also difficult to remove from water.

Nuclear and fossil-fuel power plants, in particular, have stringent water quality requirements to reduce corrosion and scaling and the associated expensive downtimes. In pressurized water reactor nuclear plants, for example, high-purity water is important in reducing corrosion in steam generators. In boiling water reactor nuclear plants, high-purity water is important in maintaining water quality in the nuclear reactor. Traditionally, makeup water treatment systems for power plants have relied almost exclusively on various combinations of filtration, ion-exchange, and reverse osmosis.

Similarly, the pharmaceutical industry requires various degrees of purified water for use in drug manufacture, injection of drugs, irrigation, and inhalation. The United States Pharmacopoeia (USP) lists standards for the various types of water used in the pharmaceutical industry, including purified water, sterile purified water, water for injection, sterile water for injection, sterile bacteriostatic water for injection, sterile water for irrigation, and sterile water for inhalation.

While drinking water is not covered by the USP, water that complies with the U.S. Environmental Protection Agency (EPA) drinking water regulations is the prescribed source water for the production of pharmaceutical grade waters. Purified water can be used to process certain drugs, particularly as a cleaning agent for equipment and in the preparation of certain bulk pharmaceuticals. Purified water, according to the USP, must meet almost all of the same purity requirements as water for injection with the exception of bacteria and pyrogen levels. As noted, purified water is produced using drinking water as the source water, which is purified using pretreatment equipment followed by at least one of ion exchange, reverse osmosis, and distillation.

Sterile purified water is not used in any drug that will be introduced directly into the bloodstream. Purified water is made sterile by heating it to a minimum temperature of 121° C. for at least 15 minutes. Water for injection, according to the USP, may be used in the production of certain drugs, also as a rinsing agent for certain equipment and the preparation of certain bulk pharmaceuticals. Water for injection can be introduced directly into a patient's bloodstream and, therefore, must meet all purified water standards and additionally meet endotoxin limits. In the processing of water for injection, a reverse osmosis or distillation unit must be used. Relatedly, sterile water for injection is packaged in volumes not larger than 1 liter and is made sterile as noted above.

Typically, sterile water for injection is used to dilute drugs which will be introduced into the bloodstream. Sterile bacteriostatic water for injection is similar to sterile water for injection that is packaged in volumes not larger than 30 milliliters and to which is added antimicrobial agents. Sterile water for irrigation is used during surgical procedures to flush tissue within the body. Lastly, sterile water for inhalation is similar to sterile water for injection that is used in inhalers and in the preparation of inhalation solutions.

FIG. 1 illustrates a schematic process flow diagram of a prior art water treatment system 10 for producing purified water and/or water for injection for use in pharmaceutical applications. As shown, feedwater, typically municipal drinking water, is fed through line 12 to a media filter unit 14 to remove bulk particulate material. The water is then passed through a water softener 16, most typically an ion exchange unit. The ion exchange unit is typically a sodium-cycle cation exchange unit that is used to remove scale-forming cations such as calcium and magnesium. In addition, water softener 16 serves to remove double and triple charged cations and reduce the tendency for coagulation of colloids that could foul downstream reverse osmosis membranes. The water is then passed through a heat exchanger 18, which is typically used in system 10 if the source water is from a surface water source such as a lake or river.

The water is passed from heat exchanger 18, if used, to a dechlorination unit 20 that includes an activated carbon bed to remove chlorine, which is typically present in the municipal drinking water that serves as the source water for the system. A dechlorination unit is necessary because the most commonly used reverse osmosis membranes, thin film composite polyamide membranes, typically have low tolerance to oxidizing agents such as chlorine. The water is then passed to a cartridge filtration unit 22, which provides a final filtration to protect the reverse osmosis membranes from fouling or other damage caused by relatively large particles generated from upstream equipment. The water is then passed to a reverse osmosis unit 24, which typically removes greater than 98 percent of dissolved substances from the feedwater. Although not shown, a double-pass configuration of reverse osmosis units can be used to achieve high quality purified water. The permeate from the reverse osmosis unit(s) is then passed to a distillation unit 26 for the production of water for injection. A storage tank 28 may also be provided to store the distilled water prior to its use in production and/or packaging in unit 30.

As noted above, municipal drinking water is either chlorinated or chloraminated to control pathogenic microorganisms. In recent years many municipalities have changed methods of water supply disinfection from chlorine to chloramines to reduce the formation of trihalomethanes (THM's), which the EPA currently limits to 100 parts per billion in potable water. THM's are formed by the reaction of chlorine with organic substances. Chloramines are formed by the addition of chlorine, which forms hypochlorous acid, and ammonia to the water. Chloramine form (mono, di, tri) is a function of pH and the chlorine/ammonia ratio, with monochloramine predominating at pH 7 or higher; dichloramine predominating at pH 4 to 5.5; and trichloramine predominating at pH 3 to 4.5 by the following reactions:

$$Cl_2 + H_2O \rightarrow HCl + HOCl \text{ (hypochorous acid)}$$

$$NH_3 + HOCl \leftrightarrows H_2O + NH_2Cl \text{ (monochloramine)}$$

$$NH_2Cl + HOCl \leftrightarrows H_2O + NHCl_2 \text{ (dichloramine)}$$

$$NH_2Cl + HOCl \leftrightarrows H_2O + NCl_3 \text{ (trichloramine)}$$

A dechlorination unit, including an activated carbon bed, is effective for the reduction of free aqueous chlorine by the following reactions:

$$C + HOCl \rightarrow CO + H^+ + Cl^- \text{ and}$$

$$C + OCl^- \rightarrow CO + Cl^-$$

and has also been used to remove chloramines, with considerably longer contact time, as follows:

$$NH_2Cl + H_2O + C \rightarrow NH_3 + Cl^- + H^+ + CO, \text{ and}$$

$$2NH_2Cl + CO \rightarrow N_2(g) + H_2O + 2Cl^- + 2H^+ + C.$$

The production of both ammonia and nitrogen gas, however, indicates that the activated carbon bed is not sufficient by itself to achieve a low concentration of both chloramine and ammonia. Moreover, ammonia is not effectively removed from water by reverse osmosis treatment.

As government regulations become more stringent and the demand for high purity water continues to grow, new and improved methods of treating municipal water to obtain high purity water are needed. To date, there is no effective method of removing chloramines, as well as weakly ionized species and organic materials, in the same system.

SUMMARY OF THE INVENTION

Accordingly, the present invention is directed to a water treatment system and process for providing high purity water. Advantages of the present invention include its ability to substantially reduce or eliminate the presence of weakly ionized and/or organic materials, including their equilibrium constituents, from water; its ability to effectively remove chloramine from water; and its ability to substantially remove the aforementioned materials while providing high resistivity water.

The system includes an inlet for introducing a feedstream into the system. The feedstream is treated downstream of the inlet in a first chemical treating unit to maintain the pH of the feedstream below about 7 to substantially reduce a concentration of weakly basic components in the water by chemical conversion to a more ionized state. A first water treatment unit is positioned downstream of the first chemical treating unit to substantially remove ionized components in the stream, and produce a first product stream. The first product stream is treated downstream of the first water treatment unit in a second chemical treating unit to maintain the pH of the first product stream above about 7 to substantially reduce a concentration of weakly acidic components in the water by chemical conversion to a more ionized state. A second water treatment unit is positioned downstream of the second chemical treating unit to substantially remove the ionized components, and produce a second product stream. The high purity water is removed from the system through a purified water outlet positioned downstream of the second water treatment unit.

In various embodiments, the first water treatment unit can be selected from the group consisting of a media filter unit, a water softener unit, a dechlorination unit, and combinations thereof. The second water treatment unit can be a single reverse osmosis unit, or staged reverse osmosis units wherein a second reverse osmosis unit is positioned downstream of the first reverse osmosis unit and upstream of the purified water outlet. An electrodeionization unit may be used in the water treatment system, in place of or in series with the reverse osmosis unit(s). The system can further include a media filter unit, a water softener unit, and/or a dechlorination unit positioned upstream of the first chemical treating unit. A mixed bed polisher unit can be positioned downstream of the purified water outlet.

In one embodiment of the water treatment system of the present invention, the system includes an inlet for introducing a feedstream into the system. The feedstream is treated downstream of the inlet in a chemical treating unit to maintain the pH of the feedstream below about 7 to substantially reduce a concentration of weakly basic components in the water by chemical conversion to a more ionized state. A first reverse osmosis unit is positioned downstream of the chemical treating unit to substantially remove the ionized components in the stream, and produce a first product stream. An electrodeionization unit is positioned downstream of the first reverse osmosis unit to produce a second product stream. A second reverse osmosis unit is positioned downstream of the electrodeionization unit to produce a third product stream. The high purity water is removed from the system from a purified water outlet positioned downstream of the second reverse osmosis unit.

In another embodiment of the present invention, a feedstream enters the system through an inlet and is treated in a first reverse osmosis unit to produce a first product stream. A first water softener unit positioned downstream of the first reverse osmosis unit receives the first product stream and produces a second product stream. The second product stream is treated in a first chemical treating unit positioned downstream of the first water softener unit to maintain the pH of the stream below about 7 to substantially reduce a concentration weakly basic components by chemical conversion to a more ionized state. The pH adjusted second product stream passes through a second reverse osmosis unit to substantially remove ionized components and produce a third product stream, which exits the system through a purified water outlet. Optionally, the system can include a second chemical treating unit positioned upstream of the first reverse osmosis unit to maintain the pH of the feedstream above about 7 to substantially reduce a concentration of weakly acidic components by chemical conversion to a more ionized state.

In another embodiment, the system includes a water inlet for introducing a feedstream into the system. The feedstream passes sequentially through a media filter unit, a first water softener unit, and a dechlorination unit, before passing through a first chemical treating unit wherein the pH of the feedstream is maintained below about 7 to substantially reduce a concentration of weakly basic components by chemical conversion to a more ionized state. A second water softener unit is positioned downstream of the first chemical treating unit to substantially remove ionized components and produce a first product stream. A second chemical treating unit is positioned downstream of the second water softener unit to maintain the pH of the first product stream above about 7 to substantially reduce a concentration of weakly acidic components by chemical conversion to a more ionized state before the stream enters a first reverse osmosis unit positioned downstream of the second chemical treating unit to substantially remove ionized components and produce a second product stream. The second product stream passes through a second reverse osmosis unit positioned downstream of the first reverse osmosis unit before exiting the system through a purified water outlet.

In another embodiment the water treatment system includes a water inlet for introducing a feedstream into the system and a first chemical treating unit to maintain the pH of the feedstream below about 7 to substantially reduce a concentration of weakly basic components by chemical conversion to a more ionized state. A water softener unit is positioned downstream of the first chemical treating unit to substantially remove ionized components and produce a product stream. A purified water outlet, positioned downstream of the water softener unit, allows the product stream to exit the system.

In another embodiment of the present invention, a water treatment process is provided. The process includes the steps of a providing a feedstream to be treated and maintaining pH of the feedstream below about 7 to substantially reduce a concentration of weakly basic components by chemical conversion to a more ionized state. The feedstream is then treated in a first water treatment unit to substantially remove ionized components and produce a first product stream. The first water treatment unit can be selected from the group consisting of a media filter unit, a water softener unit, a dechlorination unit, and combinations thereof. The pH of the first product stream is then maintained above about 7 to substantially reduce a concentration of weakly acidic components by chemical conversion to a more ionized state before the stream is treated in a second water treatment unit to substantially remove the ionized components and produce a second product stream. The second product stream is then removed from the second water treatment unit.

In another embodiment of the present invention, the water treatment process includes the step of maintaining the pH of a feedstream below about 7 to substantially reduce a concentration of weakly basic components by chemical conversion to a more ionized state. The feedstream then enters a first reverse osmosis unit to substantially remove ionized components and produce a first product stream. The first product stream is then introduced into an electrodeionization unit to produce a second product stream. The second product stream is treated in a second reverse osmosis unit to produce a third product stream.

In another embodiment, the process includes treating a feedstream in a first reverse osmosis unit to produce a first product stream, before treating the first product stream in a water softener unit to produce a second product stream. The pH of the second product stream is maintained below about 7 to substantially reduce a concentration of weakly basic components by s chemical conversion to a more ionized state before the stream enters a second reverse osmosis unit, which substantially removes ionized components and produces a third product stream. Optionally, the pH of the feed stream is maintained above about 7 to substantially reduce a concentration of weakly acidic components by chemical conversion to a more ionized state before treating the stream in the first reverse osmosis unit. To improve output quality, product recovery through the second reverse osmosis unit can be maintained at less than about 90%, flux across the reverse osmosis membranes can be increased, and/or the temperature of the process stream can be maintained below about 20° C.

In another embodiment, the water treatment process includes the steps of providing a feedstream to be purified, introducing the feedstream into a chemical treating unit to maintain the pH of the feedstream below about 7, and treating the feedstream in an activated carbon filter located immediately downstream of the chemical treating unit to produce a product stream. The product stream is then removed from the activated carbon filter.

BRIEF DESCRIPTION OF THE DRAWINGS

It is to be understood that the following drawings are for the purpose of illustration only and are not intended as a definition of the limits of the invention. In this regard, the foregoing and other objects and features of the present invention will become apparent from the following detailed description when read in light of the following drawings, wherein.

DETAILED DESCRIPTION OF THE INVENTION

The present invention is directed to a water treatment system and process for effectively removing weakly ionic as well as organic materials from feedwater. Such materials, which can include carbon dioxide, ammonia, boron, silica, and the like, are typically difficult to remove while simultaneously producing high purity water.

Figure 1:
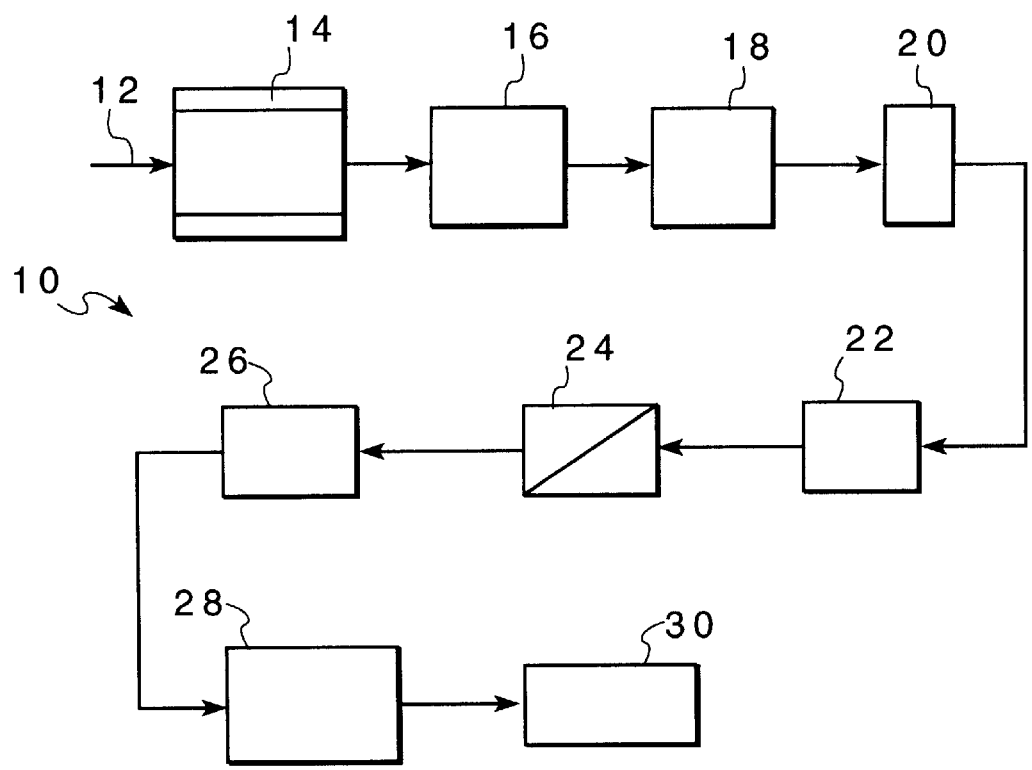
FIG. 1 is a schematic process flow diagram of a prior art water treatment system for producing purified water for pharmaceutical applications.
Figure 2A:
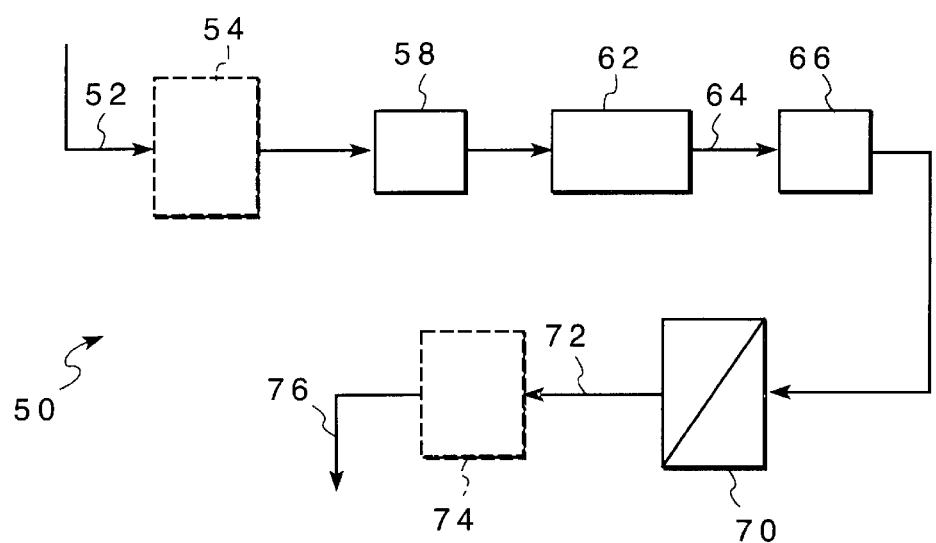
FIG. 2A is a schematic process flow diagram of one embodiment of a water treatment system of the present invention.

One embodiment of the water treatment system of the present invention is shown in FIG. 2A. As shown, a water treatment system 50 is provided in which an input/feedwater stream is introduced into the system through an inlet 52. The feedwater stream typically originates from a municipal water supply, but can also originate from a subterranean or surface water supply, or from precipitation collection.

The input/feedwater stream is treated downstream of inlet 52 in a first chemical treating unit 58 to maintain the pH of the feedstream below about 7 to substantially reduce a concentration of weakly basic components in the water by chemical conversion to a more ionized state. A first water treatment unit 62 is positioned downstream of first chemical treating unit 58 to substantially remove ionized components in the stream, and produce a first product stream 64. The first product stream is treated downstream of first water treatment unit 62 in a second chemical treating unit 66 to maintain the pH of the first product stream above about 7 to substantially reduce a concentration of weakly acidic components in the water by chemical conversion to a more ionized state. A second water treatment unit 70 is positioned downstream of second chemical treating unit 66 to substantially remove the ionized components, and produce a second product stream 72. The second product stream then exits the system directly through a purified water outlet 76 or, alternatively, passes through a polisher unit 74 to substantially remove remaining contaminants before exiting through purified water outlet 76.

As shown in FIG. 2A, system 50 can also optionally include a third water treatment unit 54 positioned upstream of first chemical treating unit 58 to pretreat the feedstream before the stream enters unit 58. Third water treatment unit 54 can be selected depending on the types and levels of contaminants found in the feedwater. Such pretreatment units include, for example, a media filter unit, a water softener unit, a dechlorination unit, and combinations thereof For example, if silica is present in the feed, it can form a colloidal system in the presence of an electrolyte, thereby posing substantial problems to downstream units. Therefore, depending on the pH maintained by first chemical treating unit 58 and on whether silica is present in the feedstream, it may be desirable to position an RO unit (not shown) upstream of first chemical treating unit 58 to remove the bulk of the silica before the feedstream enters unit 58. A preferred pretreatment sequence for most applications is media filtration, followed immediately by softening, followed immediately by dechlorination. "Immediately," as used herein, means having no intermediary treatment units therebetween.

In various embodiments, first water treatment unit 62 can be selected from the group consisting of a media filter unit, a water softener unit, a dechlorination unit, and combinations thereof. The selection of water treatment unit 62 is preferably based upon the discrete circumstances present in the treatment application.

Water softener units are traditionally used as a pretreatment method to reduce water hardness (calcium and/or magnesium content) prior to treatment with units containing membranes in order to reduce membrane fouling. Water softener units typically contain resin beads that exchange two sodium ions for every calcium or magnesium ion removed from the "softened" water.

Dechlorination units are primarily used to remove chlorine ions from solution. Although it is noted that other types of dechlorination units may be useful in the present invention, the most common type of dechlorination unit is an activated carbon filter. In addition to the ability to remove chlorine, carbon filters provide an additional benefit in their ability to adsorb small organic compounds contained in the water. Carbon's reaction with chlorine is relatively rapid, usually happening within the first minute of contact time. However, carbon is much less effective at removing chloramines from feedwater; more contact time is needed than with chlorine. The efficiency with which carbon reacts with chloramines can be increased by using carbon with a low peroxide number. A carbon's peroxide number is inversely proportional to its degree of catalytic activity. Even using carbon with peroxide numbers below 10, however, will not efficiently remove chloramine from feedwater absent extended contact time. Therefore, the dechlorination unit(s) utilized in the present invention are primarily for the removal of chlorine with a relatively short contact time.

The media filter units of the present invention preferably contain granular filtration media, such as anthracite, sand, garnet, or combinations thereof. The media can be provided in a single uniform bed, a single mixed bed, or in alternating layers of uniform or mixed composition. The choice of media, number of filter units, and configuration of filter units will depend on factors such as the type of contaminants present and the desired system flow rate. Therefore, the type and configuration of media filter units are selected according to the particular requirements of a given application.

Figure 2B:
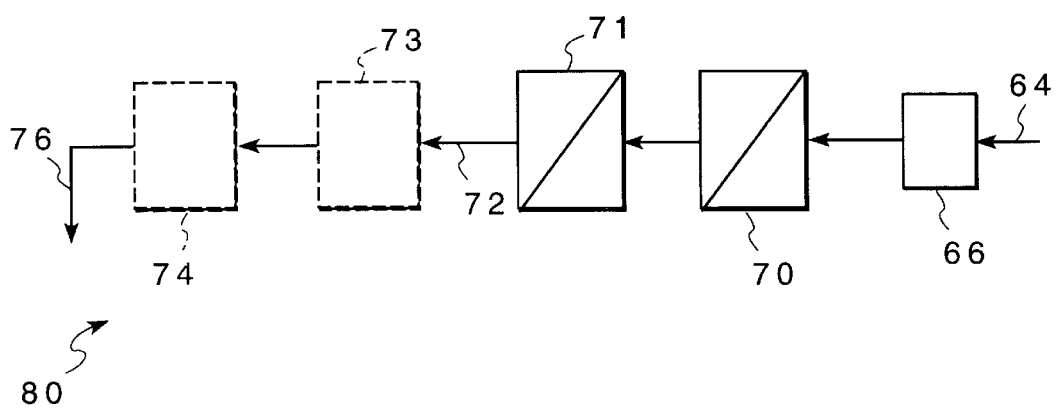
FIG. 2B is a partial schematic process flow diagram of a portion of another embodiment of a water treatment system of the present invention.

Second water treatment unit 70 can be selected from the selections available for first water treatment unit 62 and may include a reverse osmosis (RO) unit. An alternative embodiment of the present invention is shown in FIG. 2B, wherein a system 80 includes second water treatment unit 70 positioned downstream of second chemical treating unit 66, as described above with reference to FIG. 2A. In this embodiment, unit 70 is an RO unit. In addition, a second RO unit 71 is positioned downstream of unit 70 to form a multi-pass RO system, wherein the permeate from unit 70 is fed to unit 71. An electrodeionization unit 73 may also be incorporated into the system either downstream of second RO unit 71 or, alternatively, positioned between units 70 and 71 (not shown). Optionally, system 80 can further include polisher unit 74 to substantially remove remaining contaminants from second product stream 72 before the stream exits through purified water outlet 76.

Figure 2C:
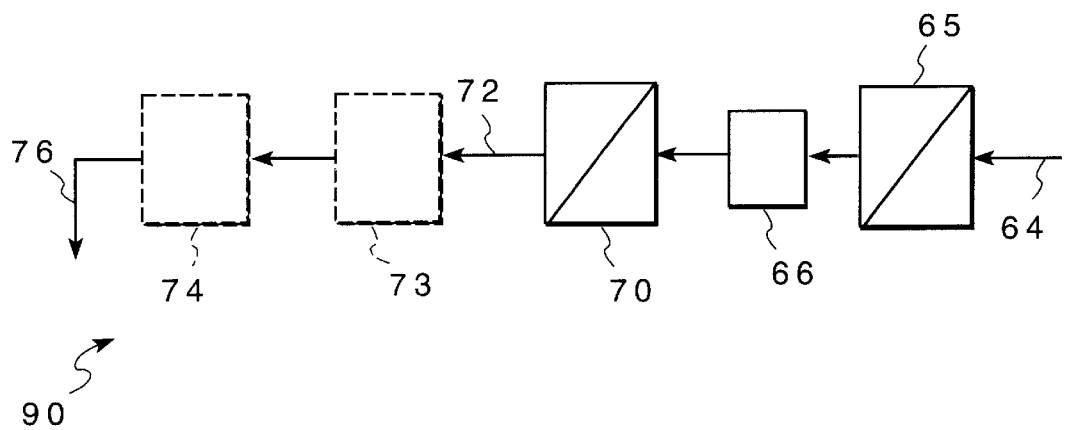
FIG. 2C is a partial schematic process flow diagram of a portion of another embodiment of a water treatment system of the present invention.

Another alternative embodiment of the present invention is shown in FIG. 2C, wherein a system 90 includes a second RO unit 65 positioned upstream of second chemical treating unit 66 and second water treatment unit 70. In this embodiment, unit 70 is an RO unit. This configuration passes first product stream 64 through unit 65. The permeate stream from unit 65 is then treated in second chemical treating unit 66, which includes a pH adjustment of the stream to above about 7 to substantially reduce the concentration of weakly acidic components by chemical conversion to a more ionized state. The pH adjusted first product stream is then fed to unit 70 to produce second product stream 72 as noted above. System 90 can also include electrodeionization unit 73 positioned downstream of unit 70, or positioned between unit 65 and second treatment point 66 (not shown), or positioned between second treatment point 66 and unit 70 (not shown). System 90 can also include polisher unit 74 to substantially remove remaining contaminants from second product stream 72 before the stream exits through purified water outlet 76.

As known to those in the art, RO can remove nearly all contaminants from feedwater. The pore structure of RO membranes is such that practically all particles, bacteria and organics greater than 300 Daltons MW are rejected. An RO unit typically contains at least one semi-permeable membrane and a pump for providing hydraulic pressure across the membrane. This hydraulic pressure is applied to the concentrated (contaminated) solution to counteract and overcome the natural osmotic pressure across the membrane. In this manner, purified water is driven from the concentrated solution (feedwater) and collected downstream of the membrane in a storage tank or directed to a point of use.

RO also involves an ionic exclusion process. Only solvent is allowed to pass through the semi-permeable RO membrane, while virtually all ions and dissolved molecules are retained. The semi-permeable membrane rejects salts by a charge phenomena action. That is, the greater the charge, the greater the rejection. Therefore, the membrane is capable of rejecting nearly all strongly ionized components but cannot reject all of the weakly ionized components (which can be removed by a deionization unit).

Different feedwater may require different types of RO membranes. Membranes are commonly manufactured from cellulose acetate, or thin-film composites of polyamide on a polysulfone porous substrate. The proper material for a particular application is determined based on the circumstances at hand.

Electrodeionization units suitable for use in the present invention include, for example, CDI® electrodeionization units, available from United States Filter Corporation, Palm Desert, Calif. As is well known, electrodeionization is also referred to as filled-cell electrodialysis and involves a process that effectively deionizes water, while the ion exchange resins positioned within the device are continuously regenerated. This electrochemical regeneration replaces the chemical regeneration of conventional ion exchange systems.

Although electrodeionization units are available in various configurations, such as a spiral design, a plate and frame design, and a circular design, each typically comprises a plurality of cells positioned between two electrodes. Each cell consists of a polymer frame onto which a cation permeable membrane and an anion permeable membrane are positioned on opposite sides. The space in the center of the cell, between the ion-selective membranes, is filled with a bed of ion exchange resins. The cells are separated from one another typically by a screen-type separator.

The feedwater entering the electrodeionization unit is separated into at least three parts. A small percentage flows over the electrodes, a majority of the feed passes through the resin beds in the cells ("diluting compartments"), and the remainder passes along the separators between the cells ("concentrating compartments").

The ion exchange resins capture dissolved ions in the feedwater at the top of the cell. Electric current applied across the module pulls those ions through the ion selective membrane towards the electrodes. Cations are pulled through the cation permeable membrane towards the cathode, and anions through the anion selective membrane towards the anode. These ions, however, are unable to travel all the way to their respective electrodes since they come to the adjacent ion selective membrane which is of the same charge. This prevents further migrations of ions, which are then forced to concentrate in the concentrating compartments. The ions concentrated in these spaces between the cells are typically flushed out of the system to the drain.

As water passes through the resin beds in the diluting compartments, it is progressively deionized. At the lower end of the diluting compartments, where water is relatively free of ions, splitting of the water occurs in the electric field. This generates hydrogen and hydroxy ions which regenerate the ion exchange resins, effectively eliminating the need for chemical regeneration. Not only is an electrodeionization unit relatively inexpensive to operate, it removes dissolved inorganics (such as carbon dioxide, boron and ammonia) effectively. Therefore, if ammonia is present in the feedwater, it is desirable to include a electrodeionization unit in the system.

The water treatment system of the present invention can further include an ultraviolet (UV) photooxidation unit (not shown) in a variety of positions to lower the level of chlorine, active microorganisms, and organic compounds within the system. A UV unit can be placed in series with any of the components in the system disclosed herein including interstage between two RO units.

UV light in the 254 nm range has been shown to be an effective germicidal treatment for water. The adsorption of UV light by the DNA and proteins in the microbial cell results in the inactivation of the microorganism. A combination of lamps producing UV radiation in both the 185 nm and 254 nm ranges has been shown to be effective in photooxidating organic compounds. Irradiation with UV light in the 185 nm range has been shown to have beneficial effects on chlorine removal. In this regard, it is believed that UV irradiation removes free chlorine from water by the following free radical mechanism:

$$Cl^- + H_2O \rightarrow HCl + .OH \text{ (free radical)} \quad (1)$$

$$.O + H_2O \rightarrow 2.OH \quad (2)$$

$$O^- + H_2O \rightarrow .OH + OH^- \quad (3)$$

The water treatment system of the present invention can further include polisher unit 74, such as a mixed bed polisher unit, positioned downstream of second water treatment unit 70. A polisher unit is designed to remove residual traces of impurities from water already treated by other means (such as RO or deionization). A typical polishing system may consist of activated carbon, mixed-bed deionization, organic scavenging mixtures, ultra-fine filtration, or a combination thereof. Specific applications may require ultrafiltration and/or ultraviolet photooxidation units within the polisher unit.

In a preferred embodiment, first chemical treating unit 58 and second chemical treating unit 66 introduce a first chemical treating agent and a second chemical treating agent, respectively, into the feedstream and first product stream 64, respectively. Chemical introduction can be by any conventional method, such as direct metered injection, direct valve injection, or bypass valve polishing. A preferred method of introduction is controlled injection, whereby the system pH is continuously monitored by sensors (not shown) at measuring points downstream of unit 58 and unit 66 respectively. The sensors, which provide an electrical signal corresponding to the pH of the process stream at the measuring points, can be placed in communication with injection controllers located within units 58, 66. The controllers perform the calculations necessary to meter the flow of chemical treating agent into the process stream. In this manner the preferred pH values can be constantly maintained at the proper locations in the water treatment system. One commercially available controller is the Red Lion™ Model PCU proportional integral/derivative controller, available from Red Lion Controls, Inc., York, Pa.

The pH values to be maintained in the feedstream and first product stream will depend on the types of contaminants present. It will be appreciated that certain, otherwise difficult to remove, weakly ionized compounds will become more highly ionized in acidic or alkaline environments, therefore, becoming more easily removable by water treatment units 62, 70. For example, as noted above, chloramine decomposes on carbon, forming nitrogen gas, ammonium and ammonia. Ammonia is a weak base and is ionized (as ammonium ion) at low pH levels. The first chemical treating agent is introduced in sufficient concentration to maintain the pH of the feedstream below about 7; and, most preferably, into the range of about 6.0 to about 6.5. Virtually all ammonia is converted to ammonium at pH 6.5. However, at a pH of about 5.5, significant amounts of carbon dioxide are present because reduction of the pH will add hydronium ions to the solution, forcing the equilibrium associated with carbon dioxide and bicarbonate to the left according to the following reactions:

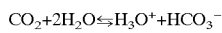

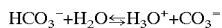

At a pH of 5.5 nearly 83% of the total carbonate present in the treatment stream is in the form of carbon dioxide. Thus, significant deviation from the preferred ranges set out above will result in either minimal ammonia conversion or increased levels of carbon dioxide.

The second chemical treating agent is introduced in sufficient concentration to bring the pH of the first product stream above about 7; and, most preferably, into the range of about 7.5 to about 8.5. Substantially all carbon dioxide is converted to bicarbonate at pH 8.3. Because higher pH values favor the formation of ammonia from residual ammonium ions, it is desirable to keep the pH as low as possible while ensuring that carbon dioxide to bicarbonate conversion is achieved. If these parameters are not observed, it is possible that excess ammonia gas formed at the higher pH value will become even more concentrated following any subsequent treatment of the second product stream 64 such as with an RO unit. However, some weakly ionized (or non-ionized) compounds, such as silica, are not normally ionized below a pH of about 9.0. Therefore, it may be desirable, in certain circumstances, to maintain the pH of the first product stream above about 9.0. In these circumstances, a recirculation loop (not shown), with an inlet positioned downstream of first treatment unit 62 and an outlet positioned upstream of first chemical treating unit 58, may be employed, if necessary, to ensure that substantially all ammonia (if present) has been removed from the feedstream.

Although not shown, it will be appreciated that divert valving and/or recycle loops can be added to any combination of units described herein. For example, depending on the types and levels of contaminants present in the feedstream, it may be desirable to divert first product stream 64 to a point of use without allowing stream 64 to pass to downstream units 66, 70. Likewise, it may be desirable to include one or more recycle loops, for example, as noted above regarding the presence of ammonia and silica.

Figure 3:
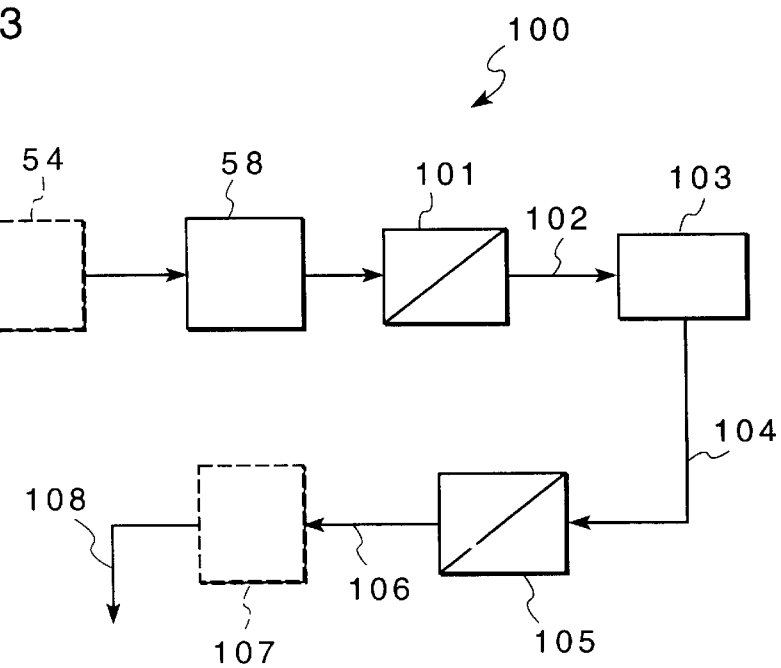
FIG. 3 is a schematic process flow diagram of another embodiment of a water treatment system of the present invention.

In another alternative embodiment of the present invention, as depicted in FIG. 3, a water treatment system 100 is provided in which an input/feedwater stream is introduced into the system through water inlet 52. The feedstream passes through chemical treating unit 58 where the pH of the stream is maintained below about 7 to substantially reduce the concentration of weakly basic components by chemical conversion to a more ionized state. The pH adjusted feedstream then passes through a first reverse osmosis unit 101 positioned downstream of unit 58 to substantially remove ionized components and produce a first product stream 102. The first product stream then passes through an electrodeionization unit 103 positioned downstream of first reverse osmosis unit 101 to produce a second product stream 104. The second product stream is treated in a second reverse osmosis unit 105 to produce a third product stream 106, which exits the system directly, through purified water outlet 108, or, alternatively, passes through polisher unit 107 to substantially remove remaining contaminants before exiting through purified water outlet 108. Optionally, the system can further include water treatment unit 54 positioned upstream of chemical treating unit 58 to pretreat the feedstream before the stream enters unit 58. As noted above, water treatment unit 54 can be selected depending on the types and levels of contaminants found in the feedwater.

Figure 4:
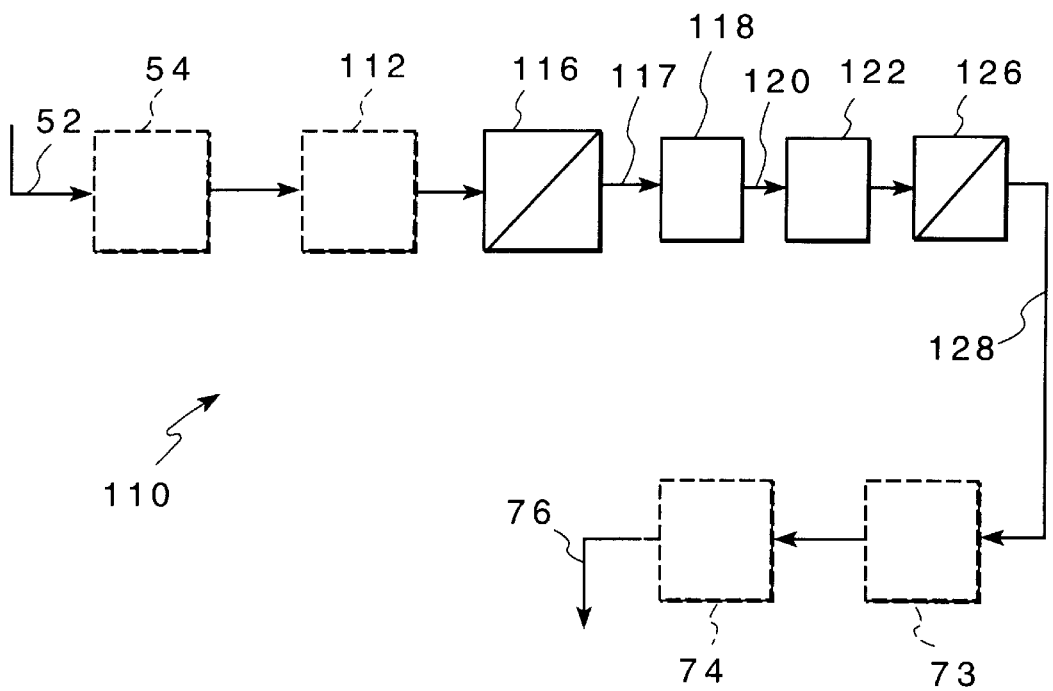
FIG. 4 is a schematic process flow diagram of another embodiment of a water treatment system of the present invention.

In another alternative embodiment of the present invention, as depicted in FIG. 4, a feedstream enters a water treatment system 110 through inlet 52 and is treated in a first reverse osmosis unit 116 to produce a first product stream 117. A water softener unit 118, positioned downstream of first reverse osmosis unit 116, receives first product stream 117 and produces a second product stream 120. The second product stream is treated in a first chemical treating unit 122 positioned downstream of first water softener unit 118 to maintain the pH of the stream below about 7 to substantially reduce the concentration weakly basic components by chemical conversion to a more ionized state. The pH adjusted second product stream passes through a second reverse osmosis unit 126 to substantially remove ionized components and produce a third product stream 128, which exits system 110 through a purified water outlet 76.

Optionally, the system can include a second chemical treating unit 112 positioned upstream of first reverse osmosis unit 116 to maintain the pH of the feedstream above about 7 to substantially reduce a concentration of weakly acidic components by chemical conversion to a more ionized state. Optionally, the system can further include water treatment unit 54 positioned upstream of second chemical treating unit 112 (if provided) and/or first reverse osmosis unit 116 to pretreat the feedstream. As noted above, water treatment unit 54 can be selected depending on the types and levels of contaminants found in the feedwater.

Water softener unit 118 can contain cation exchange resins, in the form of spherical beads or the like, to lower the ionized components in the permeate of first RO unit 116 by an ion exchange mechanism. Specifically, the cation exchange resin can be in sodium form, resulting in the exchange of a sodium ion for other ions encountered in the permeate. It has been determined that by placing the ion exchange softener unit between the RO units, the ion removal efficiency of the softener unit is increased approximately 68% to 98% relative to systems incorporating an ion exchange softener upstream of the first RO unit.

To increase the purity of the final product of any of the embodiments discussed above that incorporate a two-stage RO system, product water recovery (PWR) through the second RO unit is preferably less than about 90%; more preferably less than about 75%; and, most preferably less than about 50%. PWR is an art-recognized parameter that quantitatively describes RO performance and is generally defined as follows:

$$PWR = \frac{\text{Product water flowrate}}{\text{Feedwater flowrate}} \times 100$$

A typical RO unit includes a plurality of modules. Each module comprises a pressure vessel housing a plurality of either spiral-wound or hollow-fiber membrane elements. The preferred PWR can be achieved by connecting modules in parallel and/or by staging the retentate stream in an array of decreasing number of modules (i.e. a tapered design), whereby the retentate can be directed to a recirculation point upstream of the second RO unit. It is believed that lowering the PWR lowers the load immediately upstream of the RO membrane, resulting in an increase in the membrane's rejection efficiency.

If at least one RO unit is used in the system, the feedwater to the first RO unit is preferably maintained at a temperature less than about 20° C., more preferably less than about 15° C., and most preferably less than about 10° C. If two or more RO units are used in the system, the feedwater to one or more of the downstream RO units is preferably maintained at a temperature less than about 20° C., more preferably less than about 15° C., and most preferably less than about 10° C. In these temperature ranges, the optimum pH for the conversion of ammonia to ammonium is between about 7 and 8, and the solubility of most contaminants decreases as solvent temperature decreases. The feedwater temperature can be readily controlled with a heat exchanger, chiller, or other cooling unit, positioned upstream of the first RO unit. If desired, cooling units can be added downstream of the first RO unit to maintain the feedwater to additional RO units within these preferred ranges.

To further increase the purity of the final product of the embodiments incorporating two-stage RO, the flux across the membranes of the first RO unit and/or the second RO unit can be maintained such that the ratio of solids to liquid in the permeate stream decreases. Flux is the rate of fluid flow across an RO membrane according to the following relationship:

$$\text{Flux} = V/A \cdot T$$

wherein V is the volume of permeate produce, A is the area of the membrane, and T is a unit of time. Typically, this relationship is expressed as gallons of permeate/square feet of membrane-day (gfd). In preferred embodiments, the flux across the membranes of the first RO unit and/or the second RO unit are maintained above about 15 gfd and about 22 gfd, respectively. The permeation rate of most solids through each RO unit is not affected by increased flux. Therefore, the ratio of solids to liquid in the permeate stream decreases with increased flux.

Although the flux of each RO unit can be readily controlled by varying one or more system parameters, such as pH, operating pressure, PWR, reject flow, and temperature, the primary parameters are operating pressure and temperature. Preferred ranges of PWR and temperature have been discussed above. When operating within these preferred parameters, flux can be primarily a function of system operating pressure. In this regard, the average operating pressure across both RO units is preferably maintained above about 200 $lb_f/in^2$, more preferably above about 300 $lb_f/in^2$ by in-line pumps and/or valving.

Figure 5:
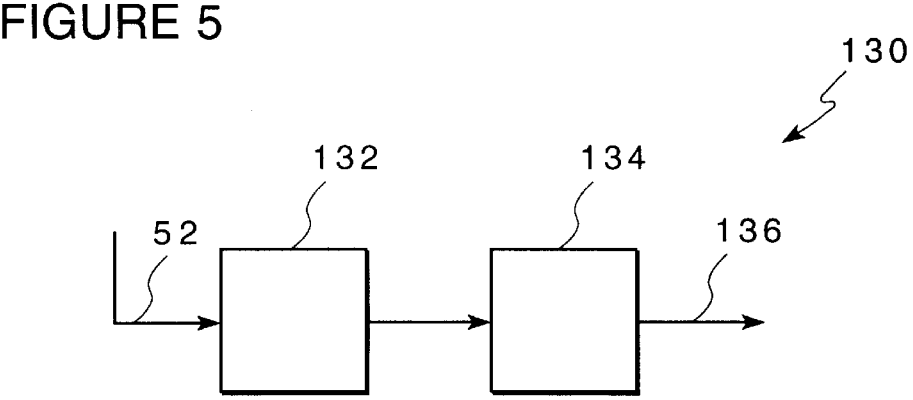
FIG. 5 is a schematic process flow diagram of another embodiment of a water treatment system of the present invention.

In another alternative embodiment of the present invention, as shown in FIG. 5, a feedstream enters water treatment system 130 through inlet 52. The feedstream is treated in a chemical treating unit 132 to maintain the pH of the feedstream below about 7, to substantially reduce a concentration of weakly basic components by chemical conversion to a more ionized state. The treated feedstream is then treated in an activated carbon filter 134 located immediately downstream of chemical treating unit 132 to produce a product stream 136. The product stream is then removed from filter 134.

If monochloramine is present in the feedstream of system 130, the pH of the feedstream is preferably maintained between 4.0 and 4.5 to convert the monochloramine to dichloramine. The carbon then dissociates the dichloramine to nitrogen, rather than ammonia and ammonium, which, in many applications, can pass through downstream equipment without adversely affecting water quality.

The present invention will be further illustrated by the following examples, which are intended to be illustrative in nature and are not to be construed as limiting the scope of the invention.

EXAMPLE 1

To determine the comparative effectiveness of the present invention in treating feedwater containing chloramines and carbon dioxide, the following tests were conducted. Four discrete water treatment systems were supplied with feedwater from the same contaminated source. When the systems reached steady state, the final product of each system was analyzed for resistivity/purity. Also, RO feed conductivity was measured immediately upstream of the first RO unit.

The supply water, which was municipal water obtained in Lowell, Mass., arrives at a point of use in the municipal water system with a conductivity value of approximately 100 $\mu$S/cm. The supply water was further treated with multimedia filtration, softening, and ultrafiltration (UF) prior to use.

Sodium bicarbonate was added to the feedstream to simulate various levels of alkalinity, while sodium hypochlorite and ammonium chloride were injected into the feedstream to form monochloramine at a predetermined concentration of 1.5 ppm. Static mixers were added to the feedstream line in series with the contaminant injectors to ensure proper distribution of contaminants.

The basic components common to all four test systems were:

1) pretreatment=2.1 cu. ft. activated carbon bed and a 5 $\mu$m cartridge filter;

2) a first water treatment unit=1.2 cu. ft. water softener; and 3) a second water treatment unit=a two-pass RO system with a 55 gallon interstage storage tank and a heat exchanger in the recycle path of the second pass RO.

In each test run, the RO system was configured to recover 50% of the feedwater on the first pass and 90% on the second pass, for an overall recovery of 45%. Each pass consisted of one 4820HR 4×40 thin film composite cartridge, available from Fluid Systems, Inc., San Diego, Calif., and was operated in a recirculate mode, with only a bleed stream from each stage and the final product stream exiting the system. Operating pressures were maintained at 200 $lb_f/in^2$ per RO pass. The temperature of the feedwater supply was 8 to 10° C., while RO pass temperatures were 15 to 18° C.

System 1 consisted only of the basic components without any pH adjustment of the product streams. System 2 consisted of the basic components with the addition of a caustic feed immediately upstream of the first RO pass. System 3 consisted of the basic components with the addition of interstage caustic injection in the RO system, which is substantially similar to the process disclosed by Pittner in U.S. Pat. No. 4,575,049, which is incorporated herein in its entirety by reference. System 4 was an exemplary embodiment of the present invention, and consisted of the basic components with the addition of acid injection immediately upstream of the softener and interstage caustic injection in the RO system.

All pH adjustments in Systems 2–4 were made with 10 gpd LMI™ chemical feed injectors, available from Liquid Metronics, a Division of Milton Roy, Inc., Acton, Mass., and Prominent™ chemical metering pumps, available from Prominent, Inc., Pittsburgh, Pa. Permeate resistivity and RO feed conductivity measurements were taken with a 200CR meter, while RO feed pH measurements were taken with a 200 pH meter, both available from Thornton, Inc., Waltham, Mass.

The acid used in System 4 was 36 to 38% electronics grade hydrochloric acid, which was further diluted to 0.1 to 0.2%, by volume, before injection. The caustic injected into Systems 2–4 was food grade sodium hydroxide pellets dissolved in water to a concentration of 0.2 to 0.8%, by weight. When necessary, feedwater alkalinity was increased by adding food grade sodium bicarbonate dissolved in water to a concentration of 8.0%, by weight.

Table 1 below details the results of the comparative effectiveness of each system. Low alkalinity was considered to be the alkalinity of the UF softened water without bicarbonate addition. Conductivity of this feedwater ranged from 72 to 218 $\mu$S/cm, with pH ranging from 7.09 to 7.80. High alkalinity was considered to be the UF softened water with the addition of 100 ppm as calcium carbonate. Conductivity of this feedwater ranged from 300 to 359 $\mu$S/cm, with pH ranging from 7.9 to 8.4.

TABLE 1

|  | Low Alkalinity 0.0 ppm $NH_2Cl$ | Low Alkalinity 1.5 ppm $NH_2Cl$ | High Alkalinity 0.0 ppm $NH_2Cl$ | High Alkalinity 1.5 ppm $NH_2Cl$ |
| --- | --- | --- | --- | --- |
| SYSTEM 1 | 0.65–1.2[1] | 0.8 | 0.3–0.65 | 0.45 |
|  | 132–135[2] | 130 | 337 | — |
| SYSTEM 2 | 3.2 | 0.35 | 2.4–3.4 | 0.9 |
|  | 97 | 218 | 345–359 | 350 |
| SYSTEM 3 | 2.5 | 2.25 | — | — |
|  | 72 | 102 | — | — |
| SYSTEM 4 | 3.0 | 3.1 | 1.1–2.8 | 1.4–3.1 |
|  | 88 | 133–140 | ~330 | ~330 |

[1]Permeate Quality, Mohm-cm
[2]RO Feed Conductivity, $\mu$S/cm

As shown in Table 1, the permeate from System 4 had a higher resistivity in both low and high alkalinity environments (i.e., 3.1 and 1.4–3.1 Mohm-cm, respectively) when low concentrations of monochloramine (i.e., 1.5 ppm $NH_2Cl$) were present in the feedwater. Thus, System 4 is superior to Systems 1–3 in producing high quality water when monochloramine is present in the feed.

EXAMPLE 2

To determine the effect of the addition of an electrodeionization unit to the present invention, the configuration of System 4 of Example 1 was fitted with a ten cell pair CDI® electrodeionization unit, available from United States Filter Corporation, Palm Desert, Calif. The electrodeionization unit was positioned downstream of the 2-pass RO unit in order to treat the RO permeate stream. The feedwater was from the same source as in Example 1. The system was activated and allowed to reach steady state. The resistivity of the system product water at steady state was consistently over 17 Mohm-cm, with a product flow rate of 0.7 gpm and 83% PWR. Therefore, the addition of an electrodeionization unit to System 4 downstream of the RO unit resulted in the consistent production of high purity water notwithstanding the variability of RO pretreatment.

EXAMPLE 3

To further evaluate the system used in Example 2 when ammonia was present in the water, 1 ppm of dilute household ammonia was injected into a system having the same configuration as that used in Example 2. The ammonia was injected downstream of the 2-pass RO unit and upstream of the electrodeionization unit. The RO unit was configured to provide an 88% PWR. The concentration of ammonia in the electrodeionization feed was 0.51 to 1.70 ppm, with a pH of 8.8 to 9.6 and a conductivity of 6.1 to 9.3 $\mu$S/cm. The feedwater to the system was from the same source as in Examples 1 and 2.

The system was activated and allowed to reach steady state. The resistivity of the system product water at steady state ranged from 17.2 to 18.0 Mohm-cm. Thus, notwithstanding the presence of ammonia which generally passes through an RO unit, the addition of an electrodeionization unit to the system results in consistent production of high resistivity water.

It will be understood that each of the elements described above, or two or more together, may also find utility in other applications differing from those described above. While the invention has been illustrated and described as embodied in a water treatment system and process, it is not intended to be limited to the details shown, since various modifications and substitutions may be made without departing in any way from the spirit of the present invention. For example, other conventional water treatment methods may be used in conjunction with the present invention as dictated by specific system requirements. Such methods may include ultrafiltration and ozonation as well as the addition of recycle loops to any of the units described herein.

Further modifications and equivalents of the invention herein disclosed will occur to persons skilled in the art using no more than routine experimentation, and all such modifications and equivalents are believed to be within the spirit and scope of the invention as defined by the following claims.

What is claimed is:

1. A water treatment process comprising the steps of:
   providing a feedstream comprising chloramines to be purified;
   maintaining the pH of the feedstream between about 6.0 and about 6.5 to substantially reduce a concentration of ammonia by chemical conversion to ammonium;
   treating the feedstream in a first reverse osmosis unit to substantially remove ammonium and produce a first product stream;
   treating the first product stream in an electrodeionization unit to produce a second product stream;
   passing the second product stream from the electrodeionization unit to a second reverse osmosis unit;
   treating the second product stream in the second reverse osmosis unit to produce a third product stream, wherein the third product steam is free of chloramines; and
   removing the third product steam from the second reverse osmosis unit.

2. The water treatment process of claim 1, further comprising the step of cooling the feedstream to below about 20° C. before being introduced into the first reverse osmosis unit.

3. The water treatment process of claim 2, wherein the temperature of the feedstream is maintained below about 15° C. before being introduced into the first reverse osmosis unit.

4. The water treatment process of claim 1, further comprising the step of cooling the second product stream to below about 20° C. before introducing said stream into the electrodeionization unit and the second reverse osmosis unit.

5. The water treatment process of claim 4, wherein the temperature of the second product stream is maintained below about 15° C. before being introduced into the electrodeionization unit and the second reverse osmosis unit.

6. The water treatment process of claim 1, further comprising the step of treating the feedstream in a dechlorination unit positioned upstream of the first reverse osmosis unit.

7. The water treatment process of claim 6, further comprising the step of treating the feedstream in a media filter unit positioned upstream of the dechlorination unit.

8. The water treatment process of claim 7, further comprising the step of treating the feedstream in a water softener unit positioned downstream of the media filter unit and upstream of the dechlorination unit.

9. A water treatment process comprising the steps of:
providing a feedstream comprising chloramines to be purified;
maintaining the pH of the feedstream between about 6.0 and about 6.5 to substantially reduce a concentration of ammonia by chemical conversion to state ammonium;
treating of the feedstream in a first reverse osmosis unit to substantially remove ammonium and produce a first product stream;
treating the first product stream in an electrodeionization unit to produce a second product stream;
passing the second product stream from the electrodeionization unit to cooling unit and directly from the cooling unit to a second reverse osmosis unit;
treating the second product stream in the second reverse osmosis unit to produce a third product stream, wherein the third product stream is free of chloramines; and
removing the third product steam from the second reverse osmosis unit.

10. The water treatment process of claim 9, further comprising passing the feedstream through a cooling unit prior to treating the feedstream in a reverse osmosis unit.

11. The water treatment process of claim 10, further comprising passing the feedstream through a dechlorination unit prior to maintaining the pH of the feedstream between about 6.0 and about 6.5.

12. The water treatment process of claim 11, further comprising passing the feedstream through a media filter unit prior to passing the feedstream through the declorination unit.

13. The water treatment process of claim 12, further comprising passing the feedstream through a water softener unit after passing the feedstream through a media filter unit and prior to feeding the feedstream through the declorination unit.

14. The water treatment process of claim 13, further comprising passing the third product stream through an ion exchange polisher unit.

15. A method of facilitating water purification comprising:
providing a chemical treating unit to maintain the pH of a feedstream comprising chloramines between about 6.0 and about 6.5 and to substantially reduce the concentration of ammonia by chemical conversion to ammonium;
providing a first reverse osmosis unit downstream of the chemical treating unit to substantially remove ammonium and produce a first product stream;
providing an electrodionization unit downstream of the first osmosis unit to produce a second product stream; and
providing a second reverse osmosis unit positioned downstream of the electrodionization unit to produce a third product stream free of chloromines.

* * * * *